United States Patent
Levin et al.

(10) Patent No.: US 10,627,310 B2
(45) Date of Patent: Apr. 21, 2020

(54) IMAGING SYSTEM FOR MULTI-FIBER CONNECTOR INSPECTION

(71) Applicant: Lifodas, UAB, Vilnius (LT)

(72) Inventors: Piotr Anatolij Levin, Vilnius (LT); Nikolajus Gavrilinas, Vilnius (LT)

(73) Assignee: Lifodas, Vilnus (LT)

( * ) Notice: Subject to any disclaimer, the term of this patent is extended or adjusted under 35 U.S.C. 154(b) by 15 days.

(21) Appl. No.: 15/575,726

(22) PCT Filed: Oct. 4, 2016

(86) PCT No.: PCT/IB2016/055913
§ 371 (c)(1),
(2) Date: Jul. 20, 2018

(87) PCT Pub. No.: WO2018/065801
PCT Pub. Date: Apr. 12, 2018

(65) Prior Publication Data
US 2019/0212227 A1    Jul. 11, 2019

(51) Int. Cl.
*G01M 11/00* (2006.01)
*G02B 6/38* (2006.01)

(52) U.S. Cl.
CPC ............ *G01M 11/31* (2013.01); *G01M 11/33* (2013.01); *G02B 6/385* (2013.01)

(58) Field of Classification Search
CPC .................................................. G01B 6/385
See application file for complete search history.

(56) References Cited

U.S. PATENT DOCUMENTS

| 9,841,567 | B1* | 12/2017 | Zhou | G02B 6/385 |
| 9,964,710 | B2* | 5/2018 | Rosson | G02B 6/385 |
| 10,185,096 | B2* | 1/2019 | Clarke | G01B 11/14 |
| 10,374,700 | B2* | 8/2019 | Schell | G01M 11/30 |
| 10,416,081 | B2* | 9/2019 | Sumpf | G01N 21/53 |
| 2006/0078264 | A1* | 4/2006 | Lauzier | G01M 11/31 385/134 |
| 2008/0174771 | A1* | 7/2008 | Yan | G01N 21/8901 356/237.5 |
| 2009/0103792 | A1* | 4/2009 | Rahn | G01N 21/4795 382/131 |
| 2014/0200164 | A1* | 7/2014 | Makarewicz, Jr. | B01F 13/0062 506/12 |

(Continued)

*Primary Examiner* — Shawn Decenzo
(74) *Attorney, Agent, or Firm* — Catherine Napjus; Michael Persson; Chisholm, Persson & Ball, PC (57) ABSTRACT

A digital fiber optic connector imaging system that can automatically capture two or more images of the endface of a multifiber connector, wherein the captured images as a group have sufficient resolution and a sufficient FOV to be used to perform a manual or automatic pass-fail analysis of the endface of every fiber terminated by the connector under inspection. In one or more embodiments, the imaging system comprises an illumination source that can operate at two or more wavelengths, one wavelength at a time, and a FOV-shifting component that includes one or more, fixed dichroic mirrors and one additional dichroic or broadband mirror. In other embodiments, the imaging system comprises a single-wavelength illumination source, an image beam splitter, and two or more image sensors located on two image planes.

6 Claims, 12 Drawing Sheets

(56) References Cited

U.S. PATENT DOCUMENTS

| | | | |
|---|---|---|---|
| 2015/0092043 A1* | 4/2015 | Baribault | H04N 5/2252 |
| | | | 348/125 |
| 2016/0170151 A1* | 6/2016 | Baribault | G02B 6/385 |
| | | | 356/73.1 |
| 2018/0067327 A1* | 3/2018 | Peng | H04N 9/09 |
| 2018/0088113 A1* | 3/2018 | Boss | G01N 33/56911 |
| 2018/0269967 A1* | 9/2018 | Schell | H04B 10/0795 |

* cited by examiner

IMAGING SYSTEM FOR MULTI-FIBER CONNECTOR INSPECTION

BACKGROUND

Field of the Invention

This disclosure generally relates to fiber optic connector inspection, and more particularly to microscopes used to inspect multifiber connectors.

Background of the Invention

Fiber optic links are key elements in many local and wide area digital broadband networks. However, even micron-sized dust particles or defects in the endface of a fiber optic connector can cause a link to fail. Thus technicians who install or maintain fiber optic equipment or cables in the field, as well as associates who perform assembly or quality assurance functions at facilities that manufacture fiber optic equipment or cable assemblies, are normally required to inspect the endface of every fiber optic connector before it is mated with another connector.

A wide range of single-fiber and multiple-fiber connector types are in use today. A popular multiple-fiber connector type called "MPO" is available in versions that can terminate from 12 to 72 individual optical fibers. For example, the endface of an MPO 32 connector includes the endfaces of 32 fibers grouped in two rows of 16 fibers each, while the endface of an MPO 72 connector includes the endfaces of 72 fibers, grouped in six rows of 12 fibers each.

Multifiber adapters for single-fiber connector inspection microscopes are disclosed in U.S. Pat. No. 8,104,976 (Zhou et. al.), U.S. Pat. No. 7,239,788 (Villeneuve), and U.S. Pat. No. 6,879,439 (Cassady). However, these systems must be operated manually and therefore may be slow or difficult to use.

An imaging system that could be used to implement adapters that would allow compatible single-fiber microscopes to automatically inspect multiple-fiber connectors, or to implement automatic, multiple-fiber inspection microscopes, is disclosed in U.S. Pat. Appl. 20150092043 (BARIBAULT). However, the preferred embodiment of this system includes one or more servomotor-controlled mirrors, and thus may not meet the reliability, drop-test, or vibration tolerance requirements of some users.

Figure 1:
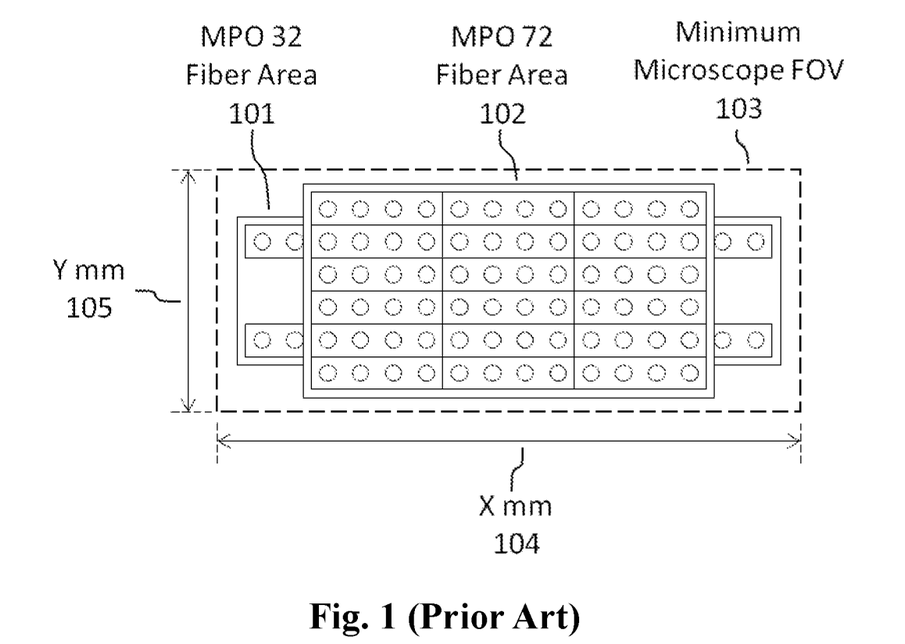
FIG. 1 (Prior Art) illustrates the minimum microscope FOV needed to capture an image of the endface of all fibers terminated by an MPO 32 or MPO 72 type multiple-fiber connector.
Figure 2:
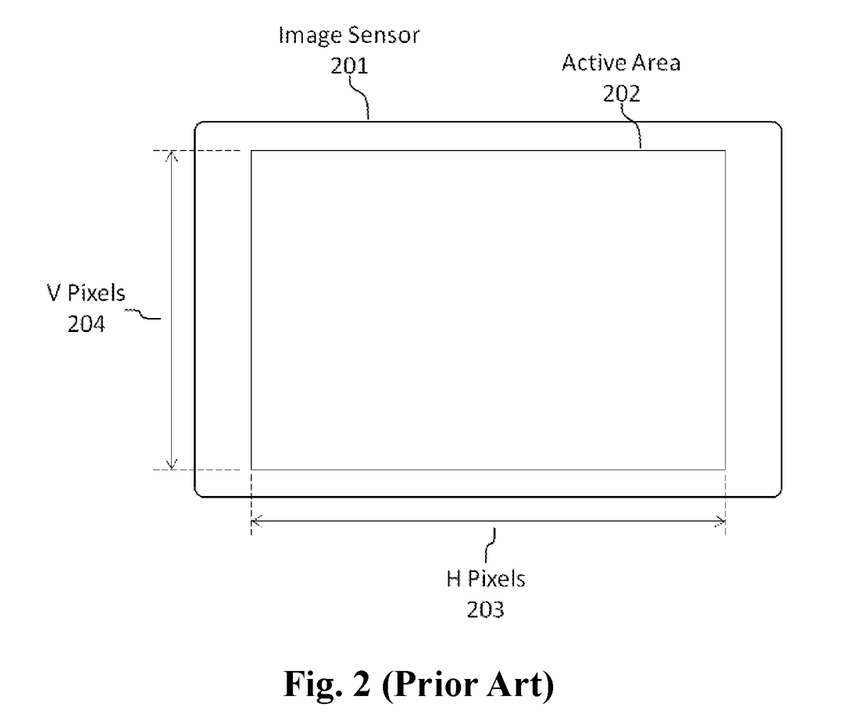
FIG. 2 (Prior Art) illustrates the image FOV of a single, large image sensor with a 3:2 aspect ratio relative to the example minimum microscope FOV shown in FIG. 1.

It is also possible to imagine a fiber optic connector microscope able to capture single images that encompass all fibers in the endface of any connector in a specified set of multiple-fiber connectors. Such a microscope could be fast and rugged. But its implementation would require the use of a very large image sensor. For example, as shown in FIG. 1, if we assume a specified set of connectors that includes MPO 32 and MPO 72 type connectors, and add some margin to account for mechanical tolerances, then the total area on the endface under inspection which must be viewable by the microscope, or the minimum microscope Field of View (FOV) 103, would be a rectangle with a horizontal dimension (H) of 4.6 mm and a vertical dimension (V) of 2.1 mm. If we further assume a sensor aspect ratio of 3:2, which is common for high pixel count, large format image sensors, then the FOV of each image captured by the sensor, or the sensor FOV, must also have a width of 4.6 mm, as shown in FIG. 2. If we further assume a microscope resolution requirement of 1 micron, and thus a pixel density requirement of about 2 pixels per micron, then the sensor would must have a total of 4600 um×2 pixels/micron=9600 pixels in the horizontal dimension. Thus the required sensor size in terms of pixels would equal $[2/3][9600]^2$ or about 56 million pixels (Mp). Or if our goal is to match the resolution of current art, single-fiber microscopes, or about 0.5 microns, then a pixel density of 4 pixels per micron may be required. In this case the image sensor would require over 200 million pixels.

Thus, there is a need in the art for an imaging system that may be used to implement multiple-fiber connector inspection microscopes that are free of the disadvantages mentioned above.

SUMMARY OF THE INVENTION

This description discloses multiple exemplary embodiments of an imaging system that can automatically capture multiple images of the endface of a multiple-fiber connector, wherein the images together encompass the endfaces of all of the individual fibers terminated by the connector. One example embodiment includes a three-wavelength illumination source, a wavelength-controlled FOV shifter, and a single image sensor. The FOV-shifter component further comprises two dichroic beam-splitters and a mirror disposed in front of the endface under inspection so that the current illumination wavelength determines which endface section is visible to the image sensor. Thus the image sensor will see the left, middle, or right section of the endface under inspection at any given time, depending on which illumination wavelength is active. In this embodiment the FOV of the objective lens and the pixel count of the image sensor must be large enough to achieve an image FOV of only about ⅓ of the total endface area.

In another embodiment, the single image sensor of the aforementioned embodiment is replaced by an image beam-splitter used to create two image planes, and two image sensors, wherein each image sensor is disposed on a different image plane. This embodiment may be used to increase microscope FOV without using a much more expensive image sensor type.

One drawback to the embodiments that include the wavelength-controlled FOV-shifter is that optical path length will be different for each illumination wavelength, which reduces auto-focus range. Two additional embodiments are provided to address this issue. The first includes an optical path length equalizer component, which may be implemented with dichroic beam-splitters and mirrors. The second includes an image separator and one image sensor per wavelength, wherein the image separator comprises one or more dichroic beam-splitters, and wherein the distance between each of these sensors and the wavelength separator is selected to achieve the same optical path length at each illumination wavelength.

Another embodiment includes an objective lens with an FOV that encompasses all individual fibers in the multiple-fiber connector under inspection, a single-wavelength illumination source, an image beam-splitter, and two or more image sensors, wherein the image beam splitter is used to create two image planes, and the sensors are disposed on these planes such that they capture images that encompass the endfaces of all individual fibers terminated by the multiple-fiber connector under inspection.

BRIEF DESCRIPTION OF DRAWINGS

The figures in this disclosure are not necessarily drawn to scale in order to clearly show relationships between the components included in the described systems. Also, the figures do not show the power, processor, driver, or other electronic circuits used to power and/or control the illumination source, autofocus lens, and image sensors.

LIST OF THE ELEMENTS USED IN THE SPECIFICATION AND DRAWINGS

101—Area on MPO 32 connector endface containing individual fiber endfaces.
102—Area on MPO 72 connector endface containing individual fiber endfaces.
103—An example minimum overall or aggregate image FOV for a microscope designed to inspect a set of connectors that includes MPO 32 and MPO 72.
104—X-width of minimum microscope FOV, in mm.
105—Y-height of minimum microscope FOV, in mm.
201—Image sensor (physical package).
202—Active area of image sensor.
203—H-sensor size in horizontal dimension, in terms of pixels. Figure illustrates a sensor with a 3:2 aspect ratio in landscape orientation.
204—V-sensor size in vertical dimension, in terms of pixels. Figure illustrates a sensor with a 3:2 aspect ratio in landscape orientation.
301—Image FOV for single large sensor (current art), FOV determined by horizontal dimension.
302—H1-single image FOV, horizontal dimension, in pixels.
303—V1-single image FOV, vertical dimension, in pixels.
400—Image FOV shifter for three wavelengths.
401—Two-way light path with all three wavelengths.
402—First reflecting surface, dichroic beam splitter, reflects $\lambda 1$, passes $\lambda 2$ and $\lambda 3$. Can be dielectric mirror with either band reflect or short reflect characteristics.
403—Two-way light path to center of FOV for $\lambda 1$ in endface (object) plane.
404—Two-way light path with only $\lambda 2$ and $\lambda 3$.
405—Second reflecting surface, dichroic beam splitter, reflects $\lambda 2$, passes $\lambda 3$. Can be dielectric mirror with either band reflect or short reflect characteristics.
406—Two-way light path to center of FOV for $\lambda 2$ in endface (object) plane.
407—Two-way light path with a
408—Third reflecting surface, dichroic mirror, reflects $\lambda 3$ and passes $\lambda 2$ and $\lambda 3$. This reflecting surface may be dichroic mirror with band reflect or long reflect characteristics; broadband dielectric mirror; or metallic mirror.
409—Light path to center of FOV for $\lambda 3$ in endface (object) plane.
410—E1, distance between mirror for $\lambda 3$ and mirror for $\lambda 1$. And thus the amount that the optical path at $\lambda 1$ must be extended.
411—E2, distance between mirror for $\lambda 3$ and mirror for $\lambda 2$. And thus the amount that the optical path at $\lambda 2$ must be extended.
412—The endface plane, and therefore the object plane of the microscope.
500—Optical path length equalizer component for three wavelengths.
501—Input optical path with all three wavelengths.
502—Dichroic beam splitter, reflects $\lambda 1$ and $\lambda 2$, passes $\lambda 3$.
503—Transmitted optical path from dichroic beam-splitter 502 with a
504—Dichroic beam splitter, passes a reflects $\lambda 1$ and $\lambda 2$.
505—Output optical path with all three wavelengths.
506—Reflected optical path from dichroic beam splitter 502 with $\lambda 1$ and $\lambda 2$.
507—Dichroic beam splitter, reflects $\lambda 2$, passes $\lambda 1$.
508—Reflected optical path from dichroic beam splitter 507.
509—Dichroic beam splitter, reflects $\lambda 2$, passes $\lambda 1$.
510—Optical path segment with $\lambda 1$ and $\lambda 2$.
511—Optical path segment with $\lambda 1$.
512—Mirror, reflect $\lambda 1$.
513—Optical path segment with $\lambda 1$.
514—Mirror, reflects $\lambda 1$.
515—Optical path segment with $\lambda 1$.
516—Horizontal distance between left and right components. All wavelengths travel this distance.
517—Vertical distance between dichroic beam splitter 502 and dichroic beam splitter 507, which should equal E2. This distance is traveled by $\lambda 2$.
518—Vertical distance between dichroic beam splitter 502 and mirror 512, which should equal E1. This distance is traveled twice by $\lambda 1$.
600—Wavelength separator component for three wavelengths.
601—Input optical path with all three wavelengths.
602—Dichroic beam splitter, reflects $\lambda 1$ and $\lambda 2$, passes $\lambda 3$.
603—Optical path segment from dichroic beam splitter 602 to output port for $\lambda 3$ 604.

604—Output port for λ3.
605—Optical path segment from dichroic beam splitter 602 to dichroic beam splitter 607, with λ1 and λ2.
606—Dichroic beam splitter, reflects λ1, passes λ2.
607—Optical path segment from dichroic beam splitter 606 to output port for λ1 608.
608—Output port for λ1.
609—Optical path segment from dichroic beam splitter 606 to output port for λ2 610.
610—Output port for λ2.
611—Length of optical path segments 603 and 607, which equals W/2.
612—Length of optical path 609, which also equals W/2.
613—Length of optical path 605, which equals D, the distance between dichroic beam splitters 602 and 606.
701—Connector under inspection.
702—Mirror.
703—Objective lens.
704—Three-wavelength illumination source.
705—Illumination beam splitter.
706—Image lens, which provides auto focus function.
707—Optical path to image sensor, which contains the image formed by the current illumination wavelength.
708—Image sensor used at all three wavelengths.
709—Image plane 1, at focus range midpoint for λ1.
710—Image plane 2, at focus range midpoint for λ2.
711—Image plane 3, at focus range midpoint for a λ3.
801—Image FOV for λ1, for sensor with 4:3 aspect ratio in portrait orientation.
802—Image FOV for λ2, for sensor with 4:3 aspect ratio in portrait orientation.
803—Image FOV for λ3, for sensor with 4:3 aspect ratio in portrait orientation.
804—Overlap of FOVs.
805—Image and sensor horizontal dimension in pixels.
806—Image and sensor vertical dimension in pixels.
1001—Optical path segment from output port for λ3 604 to image sensor for λ3 1002.
1002—Image sensor for a λ3.
1003—Image plane for a λ3.
1004—Length of optical path 1001 is equal to D 613.
1005—Optical path segment from output port for λ1 608 to image sensor for λ1 1005.
1006—Image sensor for λ1.
1007—Image plane for λ1.
1008—Length of optical path 1004 is equal to E1 410.
1009—Optical path segment from output port for λ2 610 to image sensor for λ2 1008.
1010—Image sensor for λ2.
1011—Image plane for λ2.
1012—Length of optical path segment 1007 is equal to E2 411.
1101—Beam splitter used to create two image planes.
1102—Optical path to top image sensor 1103, which carries the image created by the current wavelength.
1103—Top image sensor, which captures top row images.
1104—Image plane for top sensor, located at same distance as Image Plane 2.
1105—Optical path to the bottom image sensor, 1105, which also carries the image created by the current wavelength.
1106—Bottom image sensor, which captures bottom row images.
1107—Image plane for bottom sensor.
1201—Image FOV for λ1 and top sensor.
1202—Image FOV for λ2 and top sensor.
1203—Image FOV for λ3 and top sensor.
1204—Image FOV for λ1 and bottom sensor.
1205—Image FOV for λ2 and bottom sensor.
1206—Image FOV for λ3 and bottom sensor.
1207—Image FOV overlaps.
1208—Image and sensor horizontal dimension in pixels.
1209—Image and sensor vertical dimension in pixels.
1401—Objective lens with optical FOV large enough to cover minimum microscope FOV.
1402—Single-wavelength illumination source.
1403—Illumination beam splitter.
1404—Image lens (auto focus).
1405—Beam splitter used to create to the two image planes.
1406—Optical path segment to left image sensor, carries full image.
1407—Left image sensor.
1408—Image plane for left image sensor.
1409—Optical path segment to right image sensor, carries same image as 1406.
1410—Right image sensor.
1411—Image plane for right image sensor.
1501—Image FOV for left image sensor.
1502—Image FOV for right image sensor.
1503—FOV overlap.
1504—Image and sensor horizontal dimension in pixels.
1505—Image and sensor vertical dimension in pixels.
1601—Right image sensor.
1602—Left image sensor.
1603—Image plane for left and right image sensors.
1604—Middle image sensor.
1605—Image plane for middle image sensor.

DETAILED DESCRIPTION

The following detailed description is provided to assist the reader in gaining a comprehensive understanding of the features, components and/or systems described herein. However, various changes, modifications, and equivalents of the features, components and/or systems described herein will be apparent to persons skilled in the art. Also, descriptions of functions and constructions that are well known to persons skilled in the art may have been omitted for increased clarity and conciseness. The features described herein may be embodied in different forms, and are not to be construed as being limited to the examples described herein. Rather, the examples described herein have been provided so that this disclosure will be thorough and complete, and will convey the full scope of the disclosure to persons skilled in the art.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

This description presents various exemplary embodiments of an imaging system that can be used to implement a multiple-fiber inspection microscope. Such microscopes may include, or may be implemented as, an inspection probe or an inspection port, or both.

Figure 3:
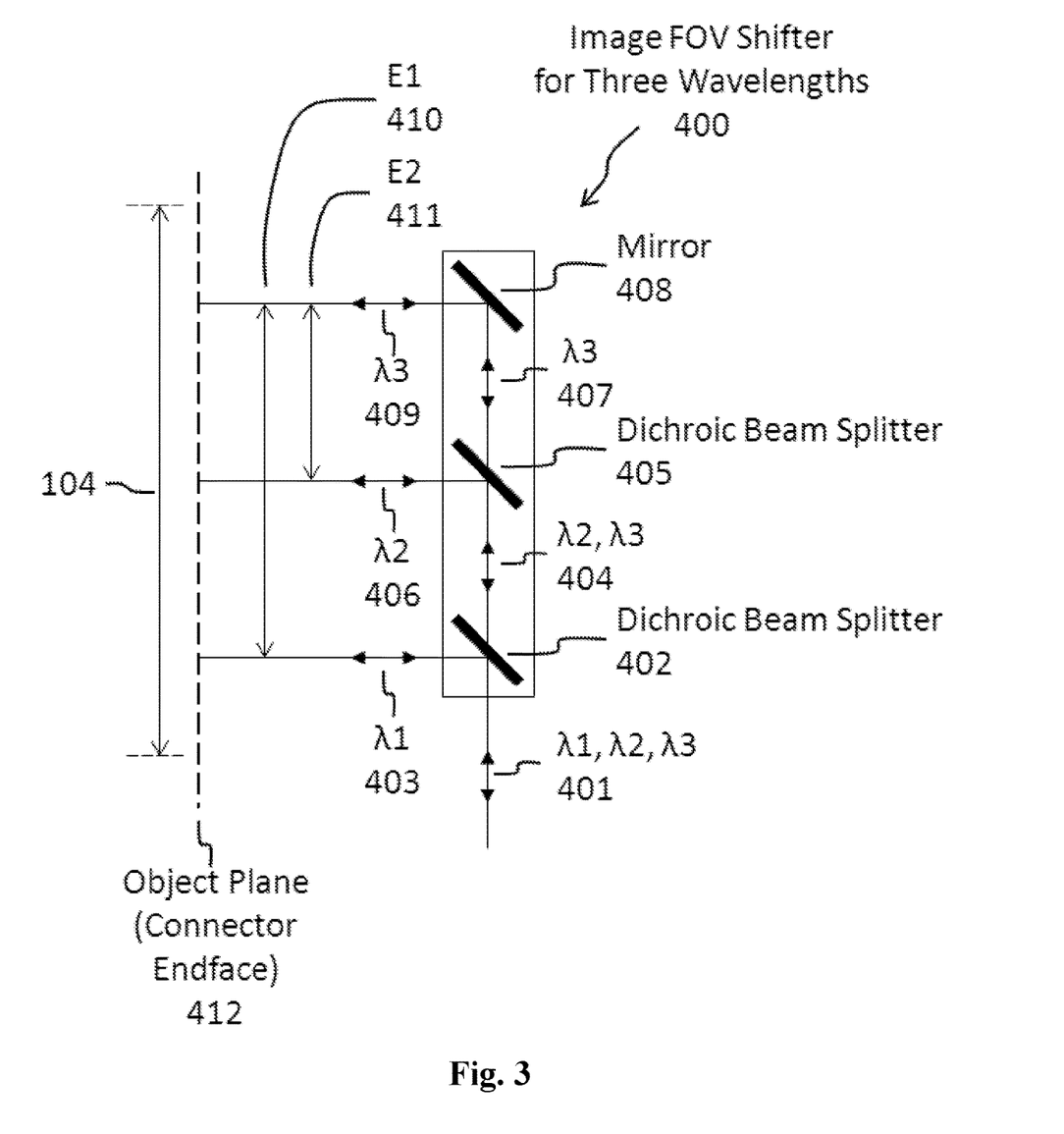
FIG. 3 illustrates the FOV shifting component that includes two dichroic beam-splitters and a mirror.

FIG. 3 shows the FOV shifter component included in one or more embodiments, wherein the current FOV is determined by which wavelength is active. The FOV-shifter component comprises three optical elements. The first is a dichroic beam splitter that reflects light at $\lambda 1$ to and from the connector endface under inspection, but passes $\lambda 2$ and $\lambda 3$. The second is a dichroic beam splitter that reflects $\lambda 2$ and passes $\lambda 3$. The third is a mirror used to reflect $\lambda 3$. The difference between the midpoint of the image FOV at $\lambda 3$ and midpoint of the image FOV at $\lambda 1$ as E1. The difference between the midpoint of the image FOV at $\lambda 3$ and the midpoint of the image FOV at $\lambda 2$ is shown as E2. Thus, to equalize optical path lengths, the optical path length for $\lambda 2$ needs to be extended by E2, while the optical path length for $\lambda 1$ needs to be extended by E1.

The dichroic beam-splitters and mirror in the FOV shifter can be designed with a variety of different wavelength characteristics. For example, all could exhibit band-reflect characteristics at their respective wavelengths. Or, if $\lambda 1 < \lambda 2 < \lambda 3$, then the dichroic beam-splitter at $\lambda 1$ could be a longpass filter with an edge between $\lambda 1$ and $\lambda 2$, the dichroic beam-splitter at $\lambda 2$ could be a longpass filter with an edge between $\lambda 2$ and $\lambda 3$, and the mirror used to reflect $\lambda 3$ could be a broadband mirror. Moreover, dichroic beam-splitters or mirrors can be constructed as dielectric mirrors deposited on the face of optically clear structures, which are then glued together and machined to create the FOV shifter above and other components described later. However, persons skilled in the art will understand that other wavelength characteristics, construction methods, and/or materials may be used to implement these components as long as their functionality, as described herein, is maintained.

Figure 4:
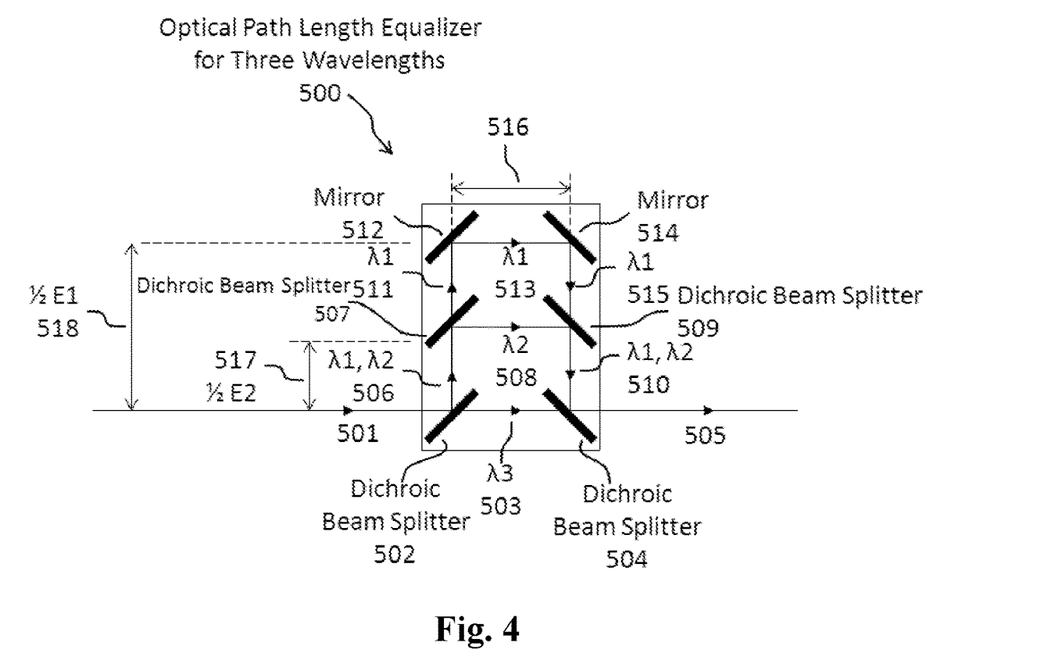
FIG. 4 illustrates the optical path length equalizer component that includes four dichroic beam-splitters and two mirrors.

FIG. 4 shows the optical path length equalizer component that is used in one or more of the embodiments of the imaging system to eliminate the optical path length differences caused by the FOV shifter. More specifically, the embodiment shown in FIG. 4, which comprises four dichroic beam splitters and two mirrors, is designed to provide equal optical path lengths for the embodiments using a three-wavelength illumination source and the three-wavelength FOV shifter shown in FIG. 3.

To see this, first note that all wavelengths passing through the optical path length equalizer experience the same horizontal extension 516. Then note that the vertical distance 517 between the two dichroic beam-splitters 502 504 that reflect $\lambda 1$ and $\lambda 2$ and the two dichroic beam-splitters 507 509 that reflect $\lambda 2$, equals ½ of the distance labeled E2 in FIG. 3. Thus the path length equalizer eliminates the difference between the optical path lengths at $\lambda 2$ and $\lambda 3$ caused by the FOV shifter. Similarly, the vertical distance 518 between the two dichroic beam-splitters 502 504 that reflect $\lambda 1$ and $\lambda 2$ and the two mirrors 512 514 used to reflect $\lambda 1$ is ½ of E1. Thus the optical path length equalizer also eliminates the difference between the optical path lengths at $\lambda 1$ and $\lambda 3$ caused by the FOV shifter.

Figure 5:
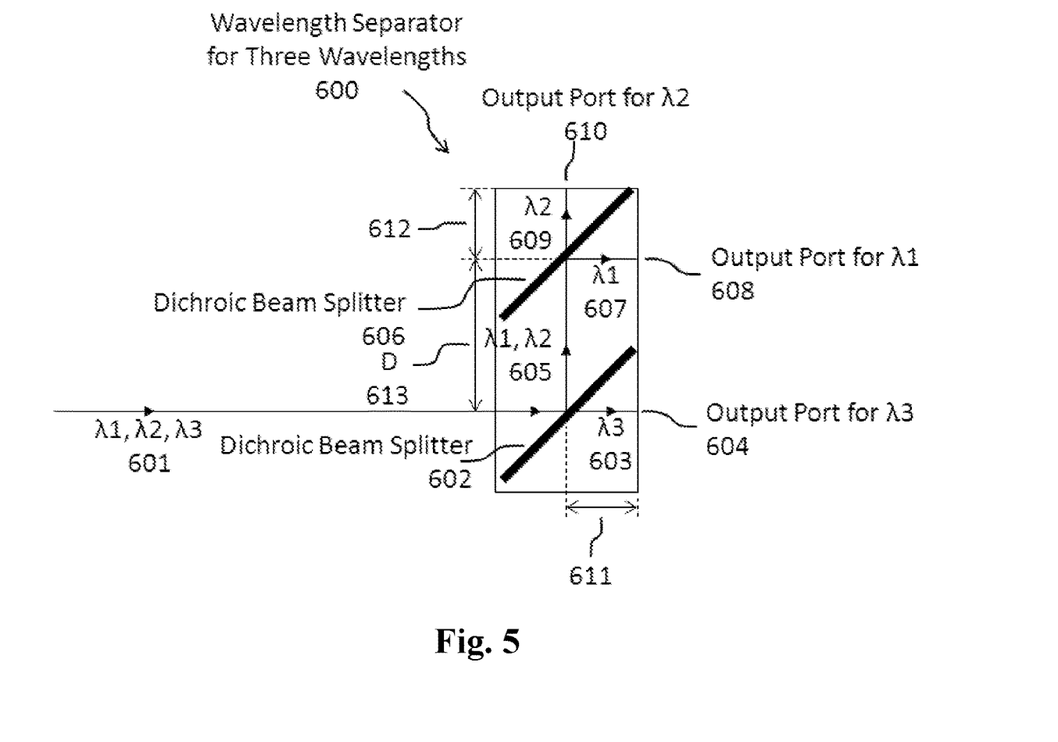
FIG. 5 illustrates the wavelength separator component that includes two dichroic beam-splitters.

FIG. 5 shows the wavelength-separator component used in one or more embodiments of the imaging system. This embodiment, which includes two dichroic beam-splitters and three output ports, is designed to direct each of three received illumination wavelengths to the image sensor indicated in the figure.

Figure 6:
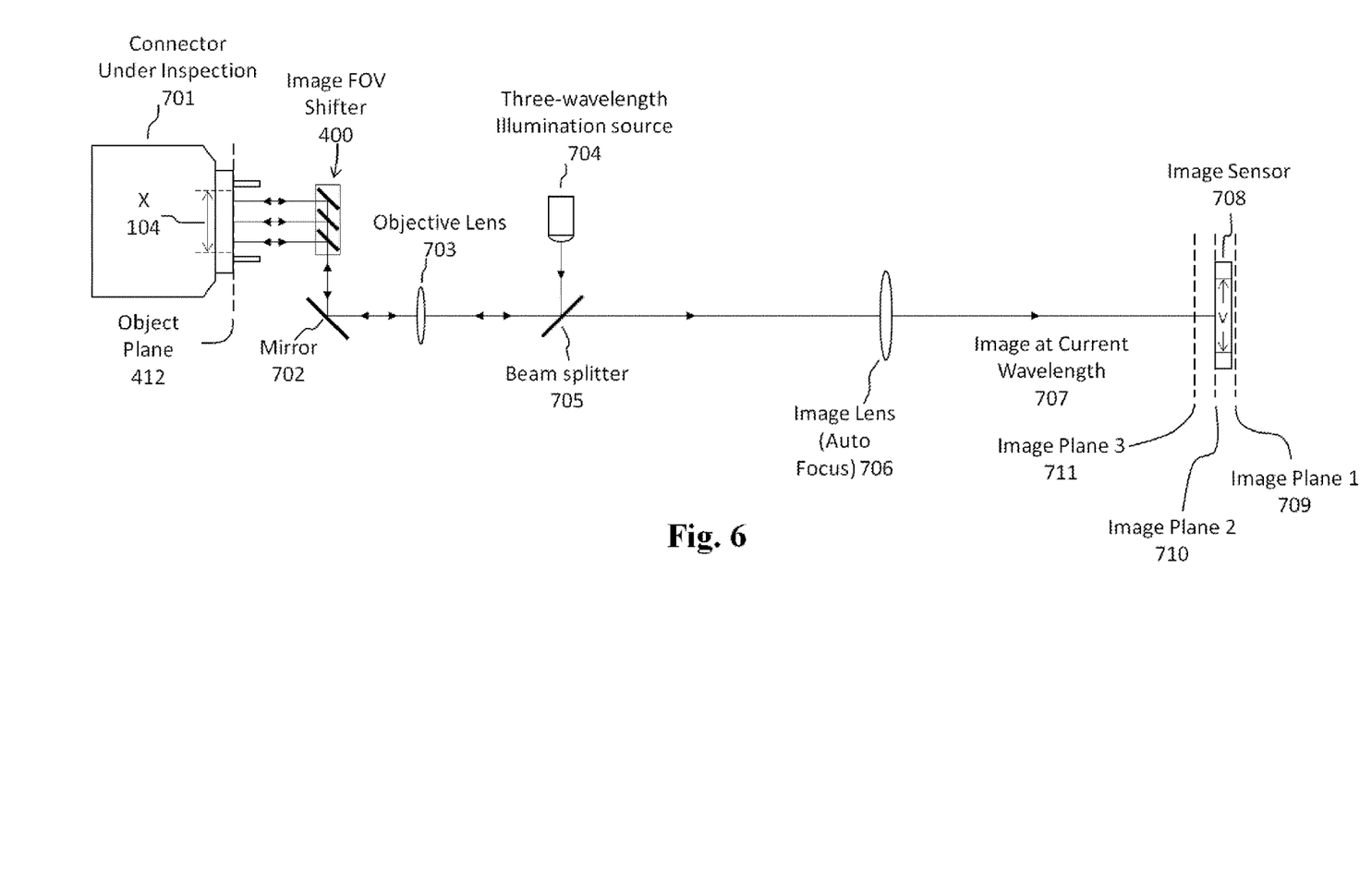
FIG. 6 illustrates the example three-wavelength, single-sensor embodiment.

FIG. 6 shows a three-wavelength, single-sensor embodiment that includes the image FOV-shifter, an objective lens, a three-wavelength illumination source and associated beam splitter, an image lens with auto-focus capability, for example a voltage-controlled liquid lens, and a single portrait-oriented image sensor. The image sensor is located at the midpoint of the focal range for $\lambda 2$. Thus the system retains full autofocus range at $\lambda 2$. However, autofocus range is reduced by the distance E2 at the other two wavelengths.

Figure 7:
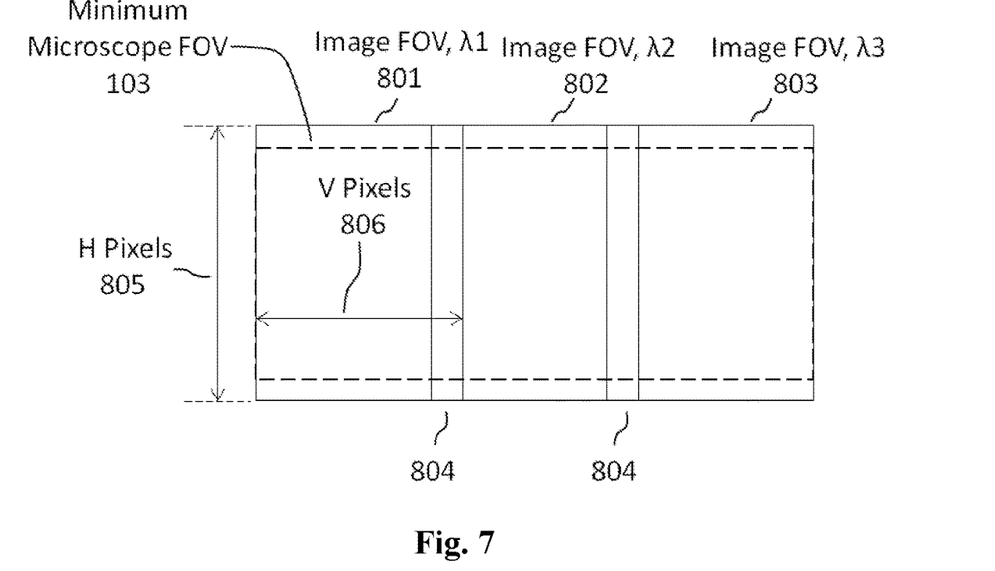
FIG. 7 illustrates how the FOVs of the three images captured by the example three-wavelength, single-sensor embodiment would cover the example minimum microscope FOV.

FIG. 7 shows how the FOVs of the images captured by the three-wavelength, single-sensor embodiment of FIG. 6 would cover the minimum microscope FOV, assuming the sensor is portrait-oriented and has a 4:3 aspect ratio.

Figure 8:
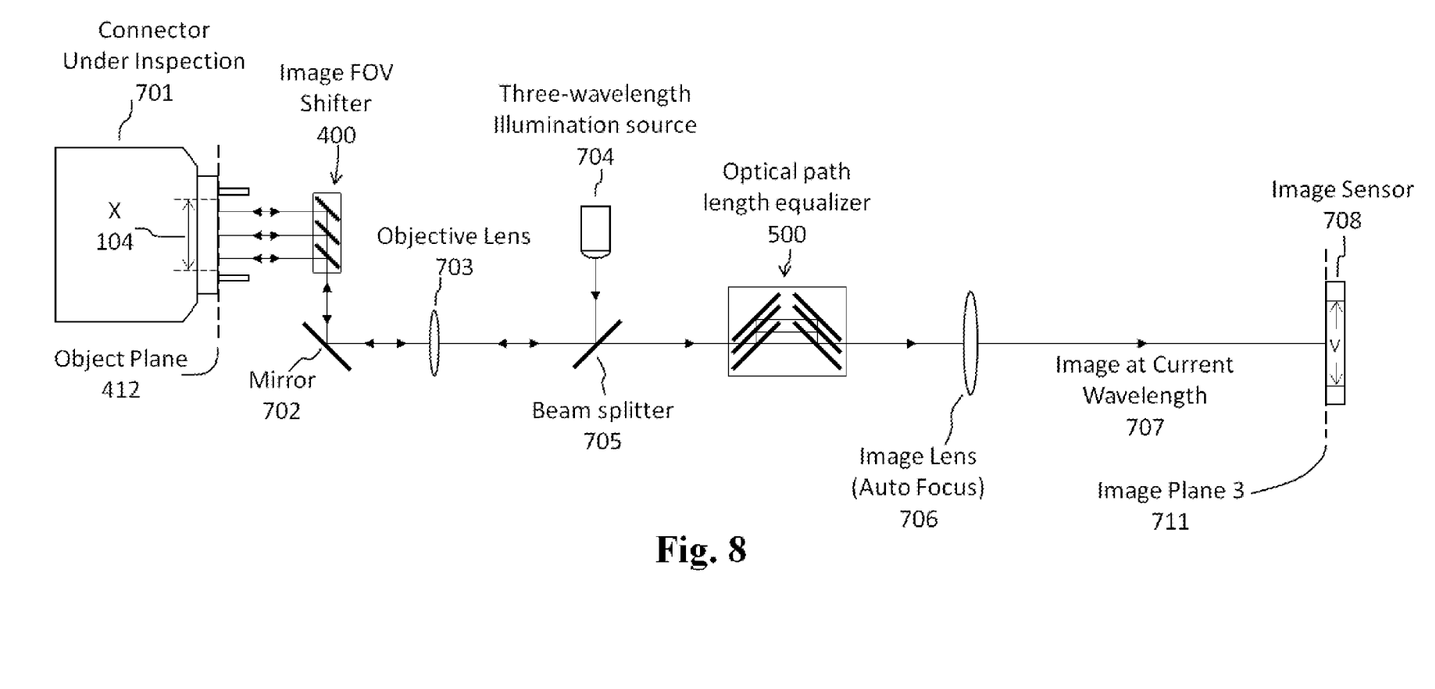
FIG. 8 illustrates the example three-wavelength, single-sensor embodiment with an optical path length equalizer.

FIG. 8 shows the embodiment of FIG. 6 modified by adding the optical path length equalizer of FIG. 4 and by moving the image sensor to the location that is at the midpoint of the autofocus range for all three-wavelengths. As a result, this embodiment enjoys full autofocus range at all three illumination wavelengths.

Figure 9:
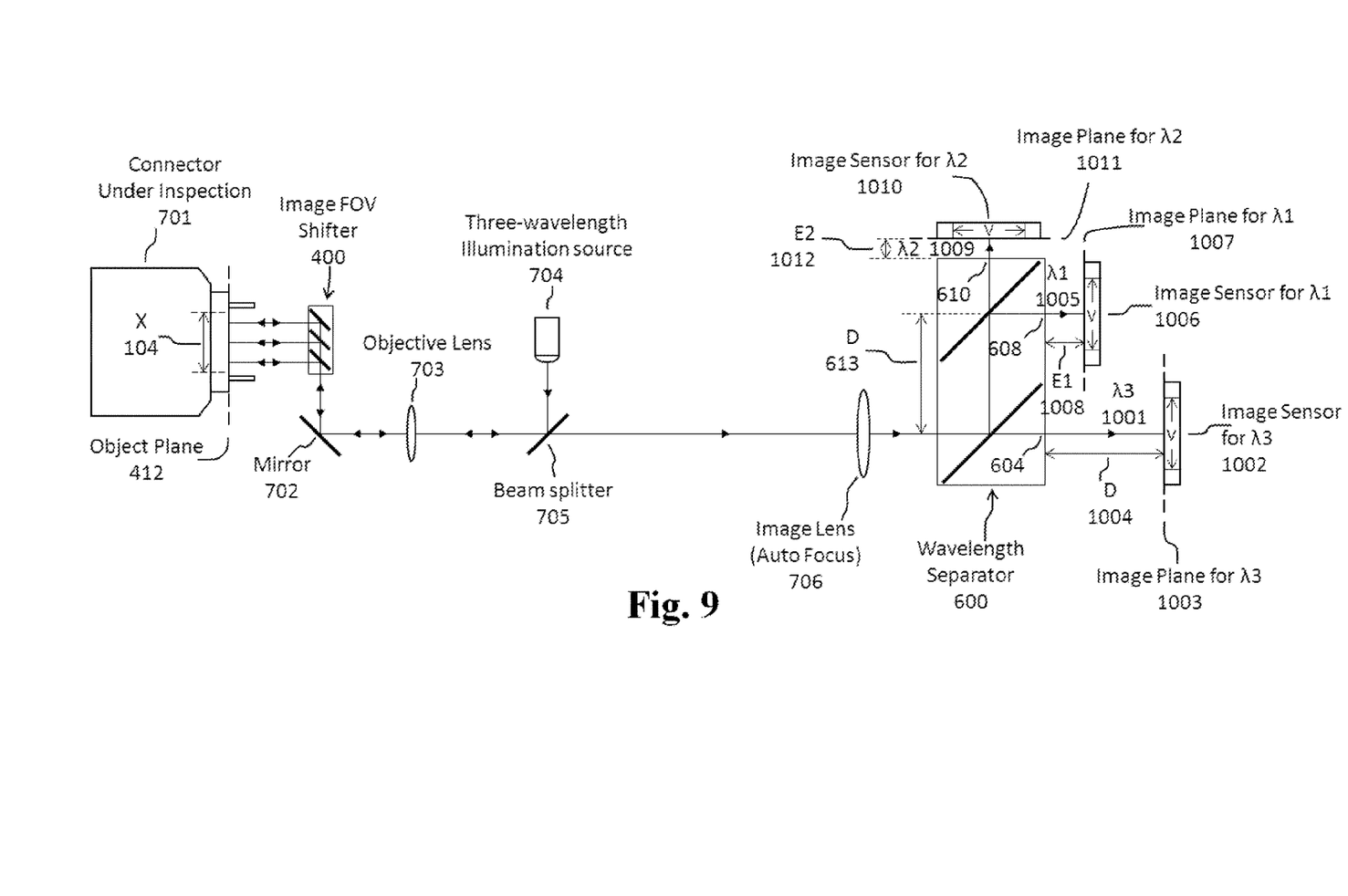
FIG. 9 illustrates the example three-wavelength, three-sensor embodiment in which the sensors are disposed to create the same optical path length at each wavelength.

FIG. 9 shows the embodiment of FIG. 6 modified by adding a wavelength separator (600) and two additional portrait-oriented image sensors. In addition, all three image sensors are positioned relative to the wavelength separator to create equal optical path lengths at all three illumination wavelengths. Specifically, the distance from the wavelength separator to the sensors used at $\lambda 1$, $\lambda 2$, and $\lambda 3$ are E1, E2, and D respectively. As described earlier, in embodiments that use the three-wavelength FOV-shifter shown in FIG. 3, E1 and E2, respectively, are the path length extensions needed to make the optical path lengths at $\lambda 1$ and $\lambda 2$ equal to the optical path length at $\lambda 3$. Another advantage of the embodiment shown in FIG. 9 is that it allows the imaging system to operate with all illumination wavelengths active at the same time, which means that all three images can be captured simultaneously rather than sequentially, which can reduce the time required to capture all images.

Figure 10:
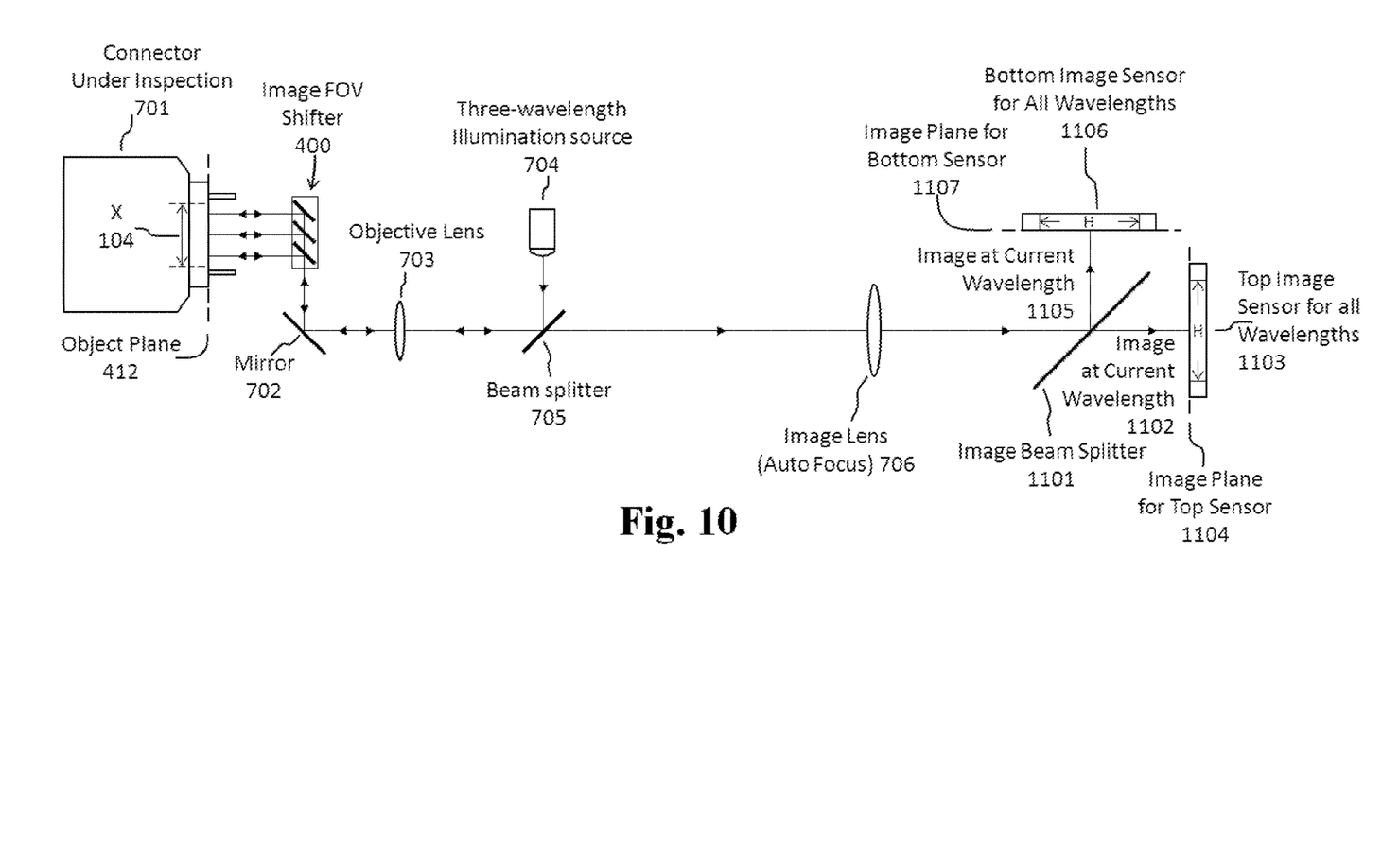
FIG. 10 illustrates the example three-wavelength, two-sensor embodiment.

The embodiment illustrated by FIG. 10 is the embodiment of FIG. 6 modified by replacing a single portrait-oriented sensor with one beam splitter and two landscape-oriented sensors in order to either create a larger microscope FOV or to increase image resolution, assuming the same type sensors are used in both embodiments. The two sensors are located on different image planes, with the Top Sensor disposed to capture images of the top half of the minimum microscope FOV, and the Bottom Sensor disposed to capture images of the bottom half of the microscope FOV.

Figure 11:
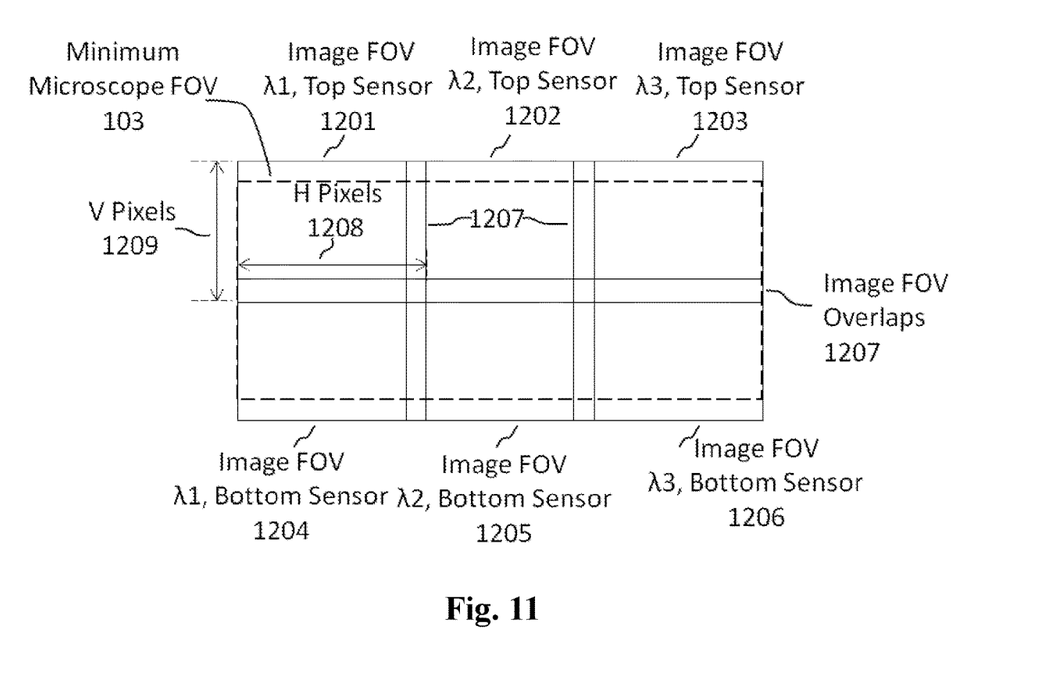
FIG. 11 illustrates how the FOVs of the six images captured by the example three-wavelength, two-sensor embodiment would cover the example minimum microscope FOV.

FIG. 11 shows how the six images created by the three-wavelength, two-sensor embodiment of FIG. 10 would cover the minimum microscope FOV, assuming both sensors included in the embodiment are landscape-oriented and have a 4:3 aspect ratio. Note that the top row of three images is captured by "Top" sensor, while the bottom row of three images is captured by the "Bottom" sensor.

Figure 12:
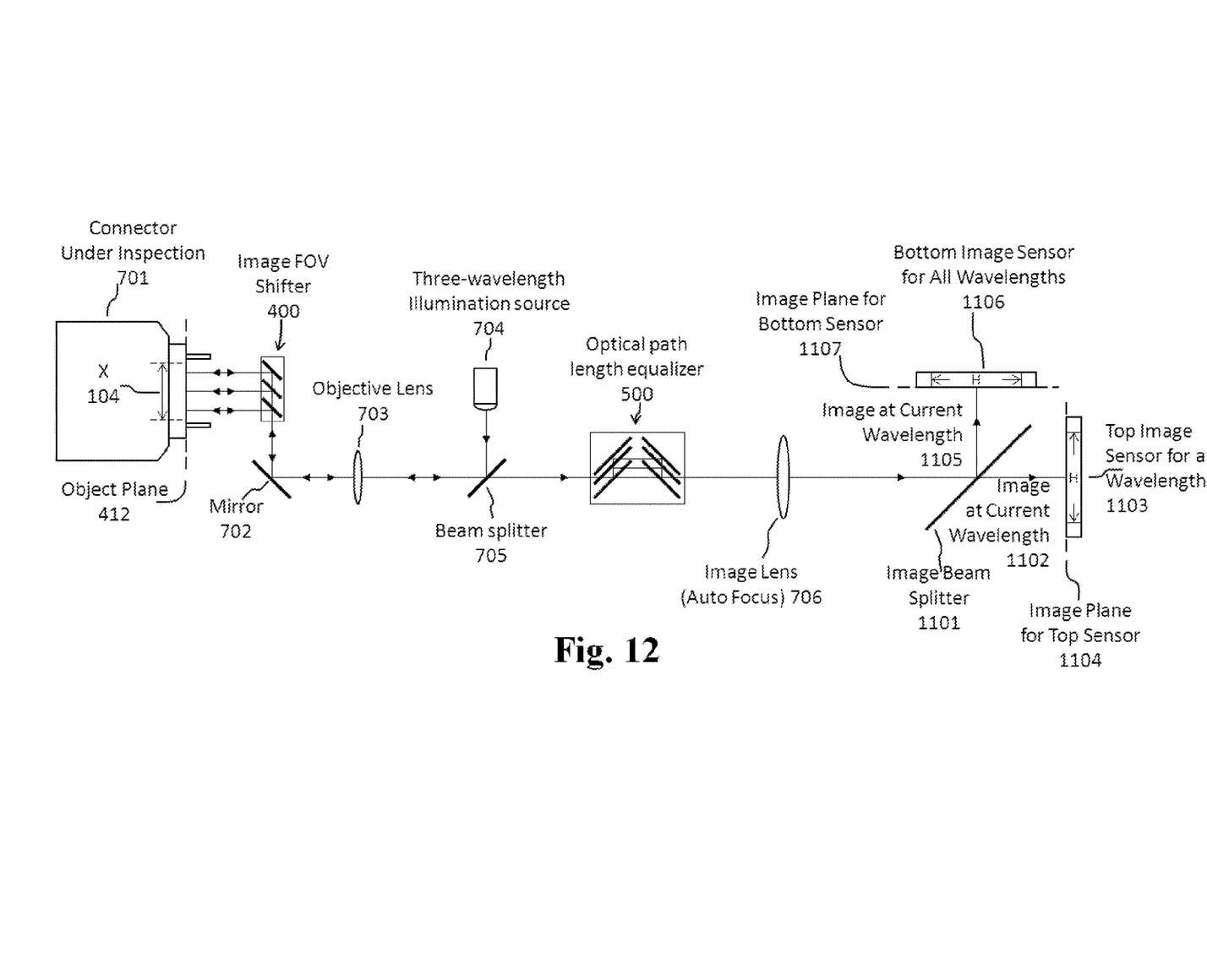
FIG. 12 illustrates the example three-wavelength, two-sensor embodiment with an optical patch length equalizer.

FIG. 12 shows the embodiment of FIG. 10 modified by adding the optical path length equalizer of FIG. 4 and by moving the two image sensors to locations that are at the midpoint of the autofocus range for all three wavelengths. As a result, this embodiment enjoys full autofocus range at all three illumination wavelengths.

Figure 13:
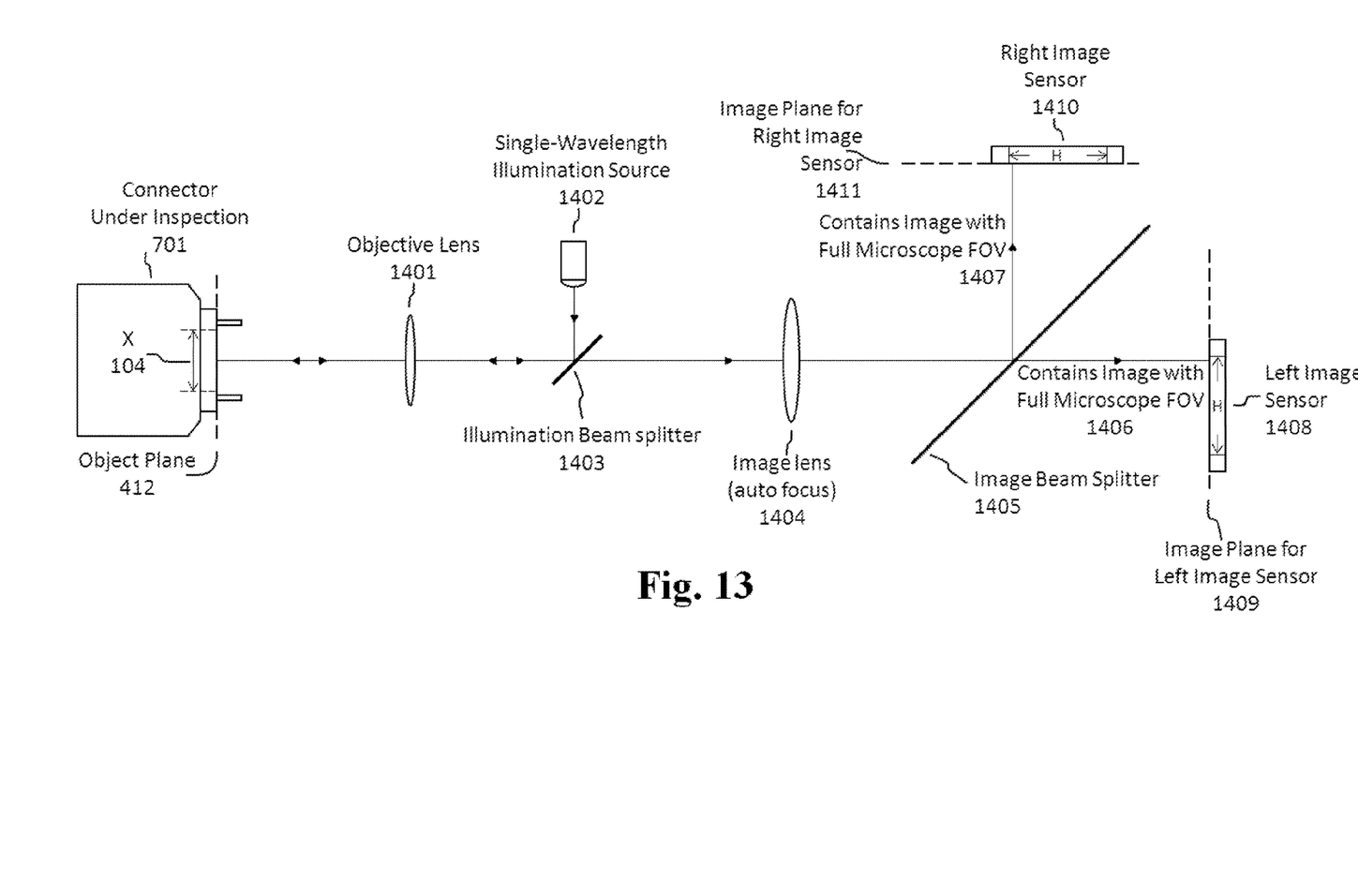
FIG. 13 illustrates the example single-wavelength, two-sensor embodiment.

FIG. 13 shows a single-wavelength, two-sensor embodiment of the imaging system, wherein two-sensors are located on two different image planes, and wherein both image planes are located at the midpoint of the autofocus range of the optical system. It should be noted that the illumination source can operate at more than one wavelength, for example to provide improved detect detection. However, this is not required for FOV shifting as it is in other embodiments.

Figure 14:
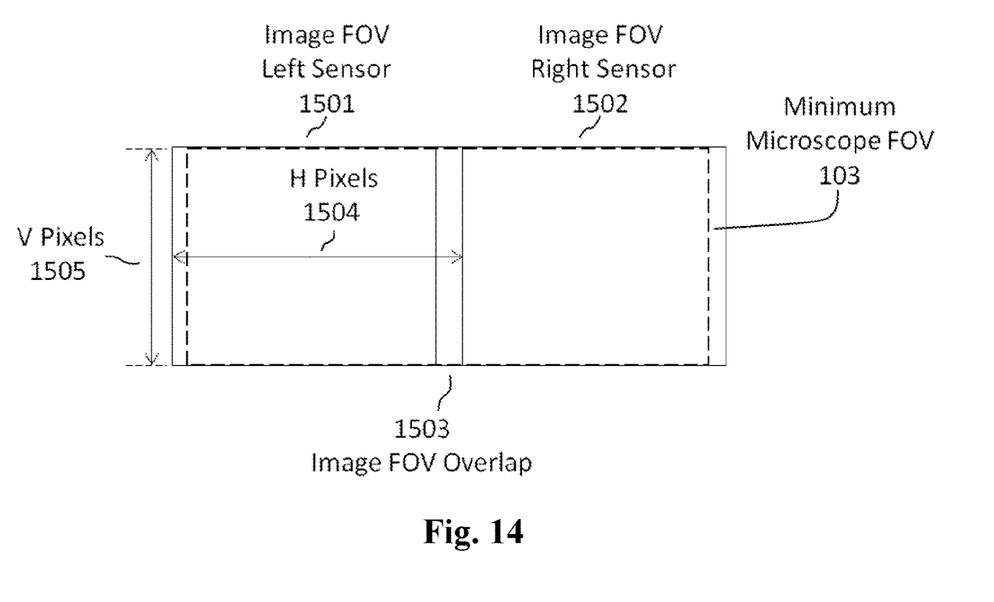
FIG. 14 illustrates how the FOVs of the two images captured by the example single-wavelength, two-sensor embodiment would cover the example minimum microscope FOV.

FIG. 14 shows how the FOVs of the two images captured by the embodiment of FIG. 13 would cover the minimum microscope FOV, assuming both sensors have a landscape orientation and a 4:3 aspect ratio.

Figure 15:
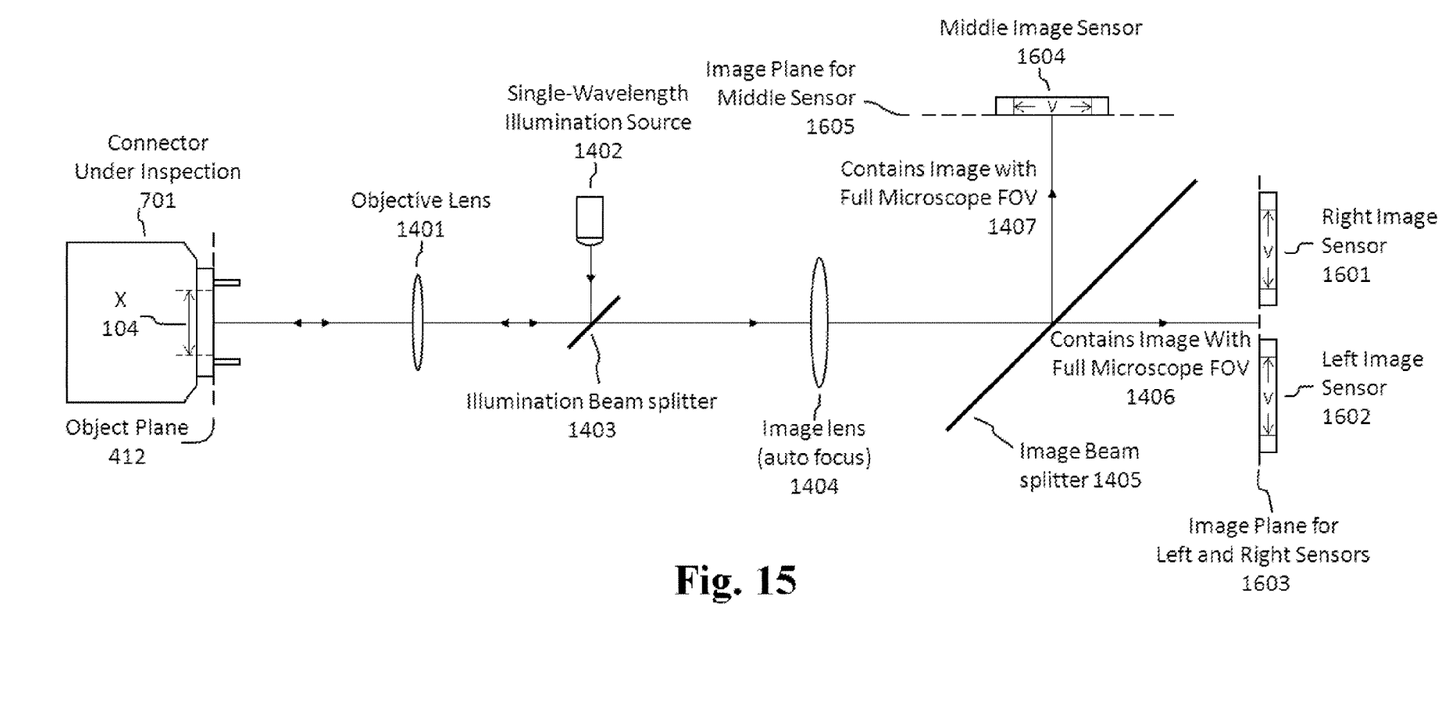
FIG. 15 illustrates an example single-wavelength, three-sensor embodiment.

FIG. 15 shows a single-wavelength, three-sensor embodiment, wherein the three sensors are located on two different image planes, and wherein both image planes are located at the midpoint of the autofocus range of the optical system. It should be noted that the illumination source can operate at more than one wavelength, for example to provide improved detect detection. However, this is not required for FOV shifting as it is in other embodiments.

Figure 16:
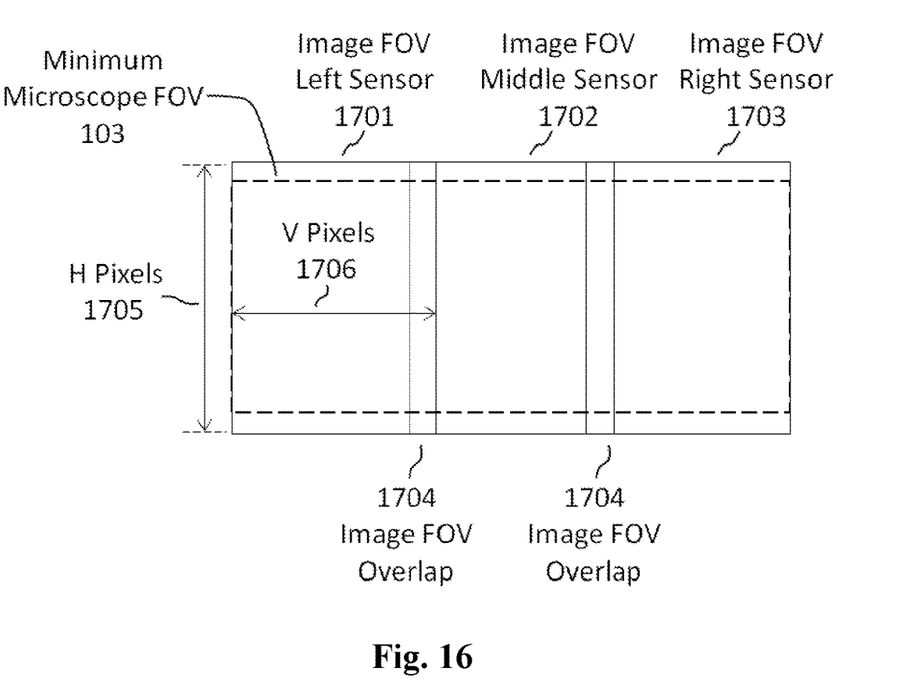
FIG. 16 illustrates how the FOVs of the three images captured by the example single-wavelength, three-sensor embodiment would cover the example minimum microscope FOV.

FIG. 16 shows how the FOVs of the images captured by the embodiment of FIG. 15 would cover the minimum microscope FOV, assuming all three sensors have a portrait orientation and a 4:3 aspect ratio.

The invention claimed is:

1. A fiber optic multifiber connector imaging system with autofocus capability for inspecting endfaces of fibers multifiber connectors, wherein said imaging system comprises:
    an autofocus range in which said imaging system autofocuses on the endface of the fiber of the multifiber connector under inspection;
    a mating structure to maintain the endface of the fiber of the multifiber connector under inspection within said autofocus range of said imaging system;
    an illumination source configured to make one of at least two wavelengths active at any given time;
    a field of view ("FOV")-shifter comprising at least one dichroic beam-splitter and a mirror, wherein said mirror is one of a group consisting of an additional dichroic beam-splitter and a broadband mirror;
    an autofocus optical system comprising at least one lens, wherein said at least one lens is one of a group consisting of a fixed lens and an autofocus lens;
    an image sensor; and
    a housing structure that houses said mating structure, said illumination source, said FOV-shifter, said autofocus optical system, and said image sensor;
    wherein said imaging system is configured to capture an image of a different section of the endface of the fiber of the multifiber connector under inspection, depending on the wavelength made active by said illumination source; and
    wherein said imaging system is configured to use the captured images to perform a pass-fail analysis of the endfaces of each of the fibers of the multifiber connector under inspection, wherein the pass-fail analysis is one of group consisting of an automatic pass-fail analysis and a manual pass-fail analysis.

2. The imaging system according to claim 1, further comprising:
    an image beam splitter configured to create two image planes; and
    at least one additional image sensor, wherein said at least two image sensors are located on the two image planes created by said beam splitter.

3. The imaging system according to claim 1, further comprising an optical path length equalizer disposed between said FOV-shifter and said image sensor, wherein said optical path length equalizer comprises:
    at least two additional dichroic beam-splitters disposed in an optical path of the wavelengths made active by said illumination source; and
    two additional mirrors.

4. The imaging system according to claim 2, further comprising an optical path length equalizer disposed between said FOV-shifter and said image sensors, wherein said optical path length equalizer comprises:
    at least two additional dichroic beam-splitters disposed in an optical path of the wavelengths made active by said illumination source; and
    two additional mirrors.

5. The imaging system according to claim 1, further comprising:
    a wavelength separator; and
    at least one additional image sensor;
    wherein said wavelength separator directs the image to said at least one additional sensor, depending on the wavelength made active by said illumination source; and
    wherein each of said image sensors is positioned relative to said wavelength separator such that an optical path length is the same regardless of the wavelength made active by said illumination source.

6. The imaging system according to claim 5, wherein said illumination source is further configured to make each of the at least two wavelengths active at the same time.

* * * * *